United States Patent
Pfefferl

(10) Patent No.: US 8,543,273 B2
(45) Date of Patent: Sep. 24, 2013

(54) CRUISE CONTROL WITH BRAKING ACTIVATED BRAKE REGENERATION

(75) Inventor: David J. Pfefferl, Broadview Heights, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 0 days.

(21) Appl. No.: 13/368,562

(22) Filed: Feb. 8, 2012

(65) Prior Publication Data

US 2013/0204472 A1 Aug. 8, 2013

(51) Int. Cl.
*B60L 11/00* (2006.01)
*B60T 8/64* (2006.01)
*B60W 10/00* (2006.01)

(52) U.S. Cl.
USPC .................. 701/22; 303/152; 180/65.265

(58) Field of Classification Search
USPC ............ 701/70, 71, 78, 83, 301, 302, 22; 342/71, 104, 118, 52, 54; 320/104, 128, 320/134, 136, 156–165; 903/930, 947, 903; 303/152, 157, 158; 180/65.265, 65.275, 180/65.285
See application file for complete search history.

(56) References Cited

U.S. PATENT DOCUMENTS

| 5,615,933 | A | 4/1997 | Kidston et al. | |
|---|---|---|---|---|
| 7,703,563 | B2 | 4/2010 | Aldrich, III et al. | |
| 7,783,396 | B2 | 8/2010 | Arita et al. | |
| 2007/0054165 | A1* | 3/2007 | Yoshida et al. | 429/23 |
| 2008/0042489 | A1 | 2/2008 | Lewis et al. | |
| 2009/0206793 | A1* | 8/2009 | Maguire et al. | 320/118 |
| 2010/0250088 | A1* | 9/2010 | Grolle et al. | 701/96 |
| 2011/0015812 | A1 | 1/2011 | Vogel | |
| 2012/0136547 | A1* | 5/2012 | Miyazaki et al. | 701/70 |
| 2012/0139329 | A1* | 6/2012 | Fabini et al. | 303/3 |

FOREIGN PATENT DOCUMENTS

WO    WO-2011-016095    * 2/2011

* cited by examiner

*Primary Examiner* — James Trammell
*Assistant Examiner* — Muhammad Shafi
(74) *Attorney, Agent, or Firm* — Fay Sharpe LLP

(57) ABSTRACT

A controller unit facilitates determining that a fast approaching forward vehicle has breached a fast approach threshold and may initiate brake regeneration to slow a commercial hybrid host vehicle in which the controller is employed. The controller determines whether there is capacity in the state of charge (SOC) of a high voltage battery to permit brake regeneration, and/or determines whether there is capacity in on board air tanks to permit a compressor motor to compress air, thereby drawing charge from the battery to create brake regeneration capacity. When battery SOC is below a predetermined threshold and a fast approaching vehicle breaches a fast approach threshold, the controller sends a brake regeneration command to a traction motor to act as a generator to supply charge to the battery, which in turn slows the vehicle.

8 Claims, 3 Drawing Sheets

CRUISE CONTROL WITH BRAKING ACTIVATED BRAKE REGENERATION

BACKGROUND

The present application finds particular application in hybrid commercial vehicle brake systems, particularly involving a cruise control activated brake regeneration system. However, it will be appreciated that the described technique may also find application in other brake regeneration systems, other vehicle energy management systems, or other brake control systems.

Classical approaches to brake regeneration include regenerative braking that warns a driver when regenerative braking is necessary. In this manner, conventional systems can discourage aggressive braking and encourage smoother even braking.

One approach relates a hybrid vehicle with a regenerative braking system that cooperates with the antilock braking system with adaptive cruise control. If cruise control is active, the regenerative braking is applied during a downhill grade to improve battery recharge while slowing the vehicle. Another approach relates to a method that uses regenerative braking to maintain a desired vehicle speed. Yet another approach relates to a hybrid system that evaluates vehicle route information to predict when braking may occur. In this manner, the system is able to keep the battery in an optimized charge state. Another technique relates to a regenerative braking system that reduces vehicle speed during downhill travel, and reduces speed during uphill travel by applying increased brake torque.

One problem with heavy duty hybrid vehicles occurs when aggressive drivers wait too long before applying the brakes when approaching an object. It is well known in the heavy duty hybrid vehicle field that energy efficiency related to brake regeneration is driver-dependent. Hybrid truck and bus manufactures often provide training and a dash-mounted fuel efficiency display to provide driver education and feedback to avoid "heavy foot" brake applications and sudden stop scenarios, in the hope that the aggressive drivers will learn from the training, heed the training gauge, and moderate their brake applications. However, aggressive drivers often decelerate only at the very last moment, using a full apply brake application to quickly stop rather than a more gentle application and a more gradual stop. Such last moment brake application does not allow time for the brake energy to be regenerated by the traction motor and stored as potential in high voltage DC batteries. Therefore, in conventional approaches energy is wasted, more fuel is consumed, and more emissions are generated, which is problematic considering a main purpose of hybrid vehicles is to conserve fuel and reduce emissions. Currently, there is no energy management system that can facilitate brake regeneration by automatically mitigating the heavy foot scenario. Aggressive braking (e.g., hard stops) wastes energy and increases brake wear, heat and brake fade. Moreover, aggressive braking necessitates a heavy brake application and is very dangerous for both the driver and surrounding traffic.

The present innovation provides new and improved systems and methods that facilitate energy recovery by mitigating heavy brake applications associated with fast object approach and aggressive driving techniques, which overcome the above-referenced problems and others.

SUMMARY

In accordance with one aspect, a controller unit that facilitates mitigating hard braking applications and extending a brake regeneration period in a commercial hybrid host vehicle upon detection of a fast approaching forward vehicle comprises a memory that stores computer-executable instructions for extending a brake regeneration period in a commercial hybrid vehicle upon detection of the fast approaching forward vehicle, and a processor configured to execute the computer-executable instructions. The instructions comprise receiving an indication of the detected fast-approaching forward vehicle, determining that the fast approaching vehicle has breached a predetermined fast approach threshold, initiating brake regeneration-adjusted compressor control, determining whether brake regeneration is available, and sending a brake regeneration command to a traction motor to initiate brake regeneration to slow the host vehicle prior to initiation of friction braking if brake regeneration is available.

In accordance with another aspect, a method of mitigating hard braking applications and extending a brake regeneration period in a commercial hybrid host vehicle upon detection of a fast approaching forward vehicle comprises receiving an indication of the detected fast-approaching forward vehicle, determining that the fast approaching vehicle has breached a predetermined fast approach threshold, and initiating brake regeneration-adjusted compressor control. The method further comprises determining whether brake regeneration is available, and sending a brake regeneration command to a traction motor to initiate brake regeneration to slow the host vehicle prior to initiation of friction braking if brake regeneration is available.

According to another aspect, a system that facilitates mitigating hard braking applications and extending a brake regeneration period in a commercial hybrid host vehicle upon detection of a fast approaching forward vehicle comprises an adaptive cruise control (ACC) that detects and monitors at least one forward vehicle in front of the host vehicle, a traction motor that acts as a generator when prompted to perform brake regeneration, and a controller comprising a processor configured to execute non-transient computer-executable instructions. The instructions comprise receiving an indication of the detected fast-approaching forward vehicle, determining that the fast approaching vehicle has breached a predetermined fast approach threshold, initiating brake regeneration-adjusted compressor control, determining whether brake regeneration is available, and sending a brake regeneration command to the traction motor to initiate brake regeneration to slow the host vehicle prior to initiation of friction braking if brake regeneration is available.

In accordance with another aspect, an apparatus for mitigating hard braking applications and extending a brake regeneration period in a commercial hybrid host vehicle upon detection of a fast approaching forward vehicle comprises means for detecting and monitoring at least one forward vehicle in front of the host vehicle, means for performing brake regeneration, means for receiving an indication of the detected fast-approaching forward vehicle, and means for determining that the fast approaching vehicle has breached a predetermined fast approach threshold. The apparatus further comprises means for initiating brake regeneration-adjusted compressor control, means for determining whether brake regeneration is available, and means for sending a brake regeneration command to the means for performing brake regeneration to initiate brake regeneration to slow the host vehicle prior to initiation of friction braking if brake regeneration is available.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

Figure 1:
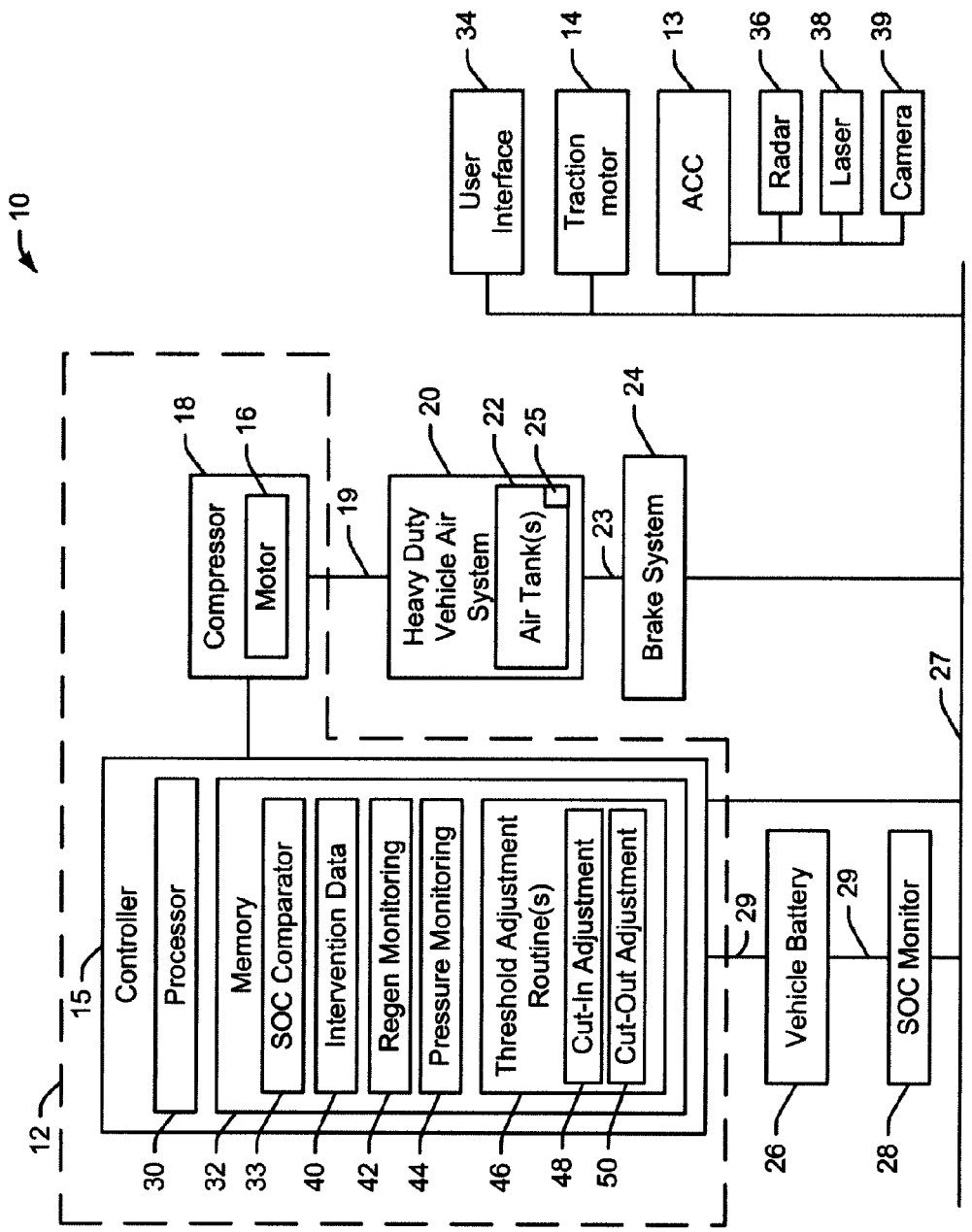
FIG. 1 illustrates an energy management system that executes an energy management algorithm employing an Electric Air Charging System (EACS) to maintain a hybrid commercial vehicle high voltage battery within a desired range of charge via brake regeneration.

FIG. 1 illustrates an energy management system 10 that executes an energy management algorithm employing an Electric Air Charging System (EACS) 12 to maintain a hybrid commercial vehicle (or the like) high voltage battery (e.g., 200V, 300V, or some other high voltage battery) within a desired range of charge (e.g., 40% to 95% of maximum charge) via brake regeneration. The systems and methods described herein improve energy recovery by mitigating heavy brake applications associated with fast forward object approach and aggressive driving techniques. This energy management approach uses adaptive cruise control (ACC) technology, optionally with braking (e.g., Bendix® Wingman® ACB or similar adaptive cruise control), to intervene by automatically initiating brake regeneration when a driver is approaching an object aggressively. When a fast approach is detected, the system issues a request to a traction motor (acting as a generator) to start brake regeneration earlier than is conventionally done, thereby permitting time for more brake energy regeneration. When an ACC module 13 detects an impending fast approach (e.g., a forward vehicle that has applied its brakes and is being rapidly overtaken be the host vehicle), the system sends a request to a traction motor 14 to begin to slow the vehicle at a rate that would regenerate the battery State of Charge (SOC.) Slower, steady braking provides more regenerative energy than a hard, fast braking event. If the high voltage battery SOC is low and there is an opportunity to regenerate the brake energy, system issues a "regeneration alert" (e.g., a controller area network (CAN) message, etc.) to alert the driver that the SOC needs to be replenished and/or has been automatically initiated by the system. The driver is then reminded that subsequent, gentle brake applications can be made to replenish the SOC of the battery. In one embodiment, the driver is provided haptic feedback (e.g., via vibration of the steering wheel or the like) to inform him that brake regeneration has been automatically initiated.

The EACS 12 comprises a controller 15 that controls a variable speed, brushless DC (BLDC) motor 16 that drives an electric compressor 18. Other prime movers, such as an induction motor, are also contemplated. Electric compressor technologies employed in conjunction with the herein-described features can include by way of example and not limitation reciprocating, screw, scroll, rotary, and/or any other suitable type of compressor. The electric compressor 18 compresses the air and provides, via an air supply line 19, an air pressure supply to a heavy duty vehicle air system 20 that comprises one or more air tanks 22 that are tilled by the compressor 18 and which supply air pressure via an air supply line 23 to a brake system 24.

The controller 15 communicates with other vehicle controllers (not shown) and acquires vehicle operational status (e.g., state of charge) of a high voltage battery 26 of the vehicle or the like over the vehicle serial bus 27 (e.g. a J1939 controller area network (CAN) bus or the like). Additionally, the controller 15 communicates with a pressure monitoring device, such as a pressure sensor 25 in the air tank(s) 22. The controller continuously or periodically monitors vehicle operational status in order to intelligently control the energy required to maintain a desired battery state of charge (SOC). Although the battery described herein is a high voltage vehicle battery, it will be appreciated that the described systems and methods may be employed with any suitable power source, as well as with any suitable air compressor or load on the power source. The controller continuously or periodically monitors vehicle operational status in order to intelligently control the energy required to maintain a desired state of charge (SOC). An SOC monitor 28 monitors the SOC of the vehicle battery 26 to determine whether there is capacity to store brake regeneration energy. The battery may be, for example, a lithium ion battery, a nickel metal hydride battery, a lead acid battery, a variant of the foregoing battery types, or any other suitable battery. The battery 26 is coupled via power lines 29 to the SOC monitor and the controller.

The SOC monitor 28 provides SOC information to a processor 30 of the controller. In another embodiment, SOC is monitored by a software module (not shown) stored in a memory 32 and executed by the processor 30. The SOC monitor may also be a in a unit separate from the controller and received by the controller 15 over the serial bus 27. The memory 32 stores an SOC comparator module 33 that, when executed by the processor, compares received SOC information (e.g., measured SOC on an onboard high voltage battery) to one or more SOC thresholds to determine whether the battery has capacity for storing additional charge. In one embodiment the SOC threshold is approximately 70% of a maximum SOC rating for the battery, and the brake regeneration command is sent to the traction motor when measured SOC is less than the SOC threshold.

The memory 32 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 30. Additionally, "module," as used herein denotes a set of computer-executable instructions (e.g., a routine, sub-routine, program, application, or the like) that is persistently stored on the computer-readable medium or memory for execution by the processor.

If the SOC is low as determined by the SOC comparator 33, there is the opportunity to increase SOC through brake regeneration. In this case, the controller can send an alert to the driver via a user interface 34 to initiate a generator regeneration protocol, such as by tapping the brakes to engage the traction motor 14 and initiating brake energy regeneration to recharge the battery 26. The traction motor also serves as an energy regeneration device and as a mechanical load to slow the vehicle without the use of the friction brakes. By monitoring the SOC and mitigating heavy braking applications associated with aggressive braking and fast forward vehicle approaches, brake regeneration is facilitated. Increased brake regeneration opportunities result in improved energy recovery, less brake wear, and safer vehicle operation. Accordingly, the system comprises a radar module 36 and/or a laser module 38, which track forward vehicles and provide information related thereto to the ACC module 13 (e.g., a Bendix® Wingman® ACB or the like) so that the controller can intervene and slow the host vehicle when a driver is approaching a forward vehicle or object aggressively. Additionally or alternatively, the ACC module 13 is coupled to a camera sensor 39 that detects forward objects. The camera sensor captures an image of a forward object and compares various properties of the image (e.g., pixel and contrast information, etc.) to stored images to determine whether the forward object is a vehicle that warrants tracking or a non-vehicle object that may be dismissed. It will be appreciated that although the radar 36, laser 38, and camera 39 are depicted as being connected to the ACC 13, in another embodiment the radar 36, laser 38, and camera 39 are connected to the bus 27, to which the ACC 13 is also connected.

When a fast approach is detected by the ACC 13 and communicated on the vehicle bus 27 and the SOC is low enough to allow capacity for energy regeneration, the controller communicates a request to the traction motor/generator 14 to act as a generator and perform regenerative braking. With the generator converting forward kinetic energy and acting as a load, the vehicle will slow, energy will be recovered and the battery SOC will be replenished. The more timely the deceleration of the host vehicle as it approaches a forward vehicle or object, the more likely a subsequent heavy brake application can be prevented, which mitigates brake fade, heat, and unsafe conditions caused by heavy braking. The feeling of deceleration associated with the brake regeneration intervention also serves to provide feedback and a form of training to the driver that a fast approach has been detected and is being mitigated. Additionally, aggressive brake application intervention event data 40 can be stored in the memory and subsequently be used to provide driver behavior profiles and histories.

Accordingly, the system may comprise a pressure monitoring sensor 25 in the air tanks 22 that communicates the air tank pressure to the controller 15. The system further comprises a pressure monitoring module 44 that monitors pressure from in the air tanks 22. When pressure is below a predetermined threshold, then the compressor motor 16 can be activated to build pressure in the tanks. This in turn consumes battery charge, thereby reducing the SOC and providing capacity for brake regeneration. A brake regeneration monitoring module 42 is executed by the processor to evaluate and govern air tank pressure, SOC, and the like in order to ensure that brake regeneration is available (e.g., by ensuring that SOC is sufficiently low to permit regeneration). If the SOC monitor communicates that the battery SOC is low, then the controller can issue a "regen alert" (J1939 CAN message to driver display or user interface, etc.) to alert the driver that the SOC needs to be replenished and/or has been initiated automatically. The driver is reminded that there is an opportunity for brake regeneration and that subsequent, gentle brake applications can be performed to replenish the SOC. This feature reinforces driver feedback that anticipatory brake applications are needed for fuel efficient and safe operation and that aggressive stops should be avoided.

In one embodiment, the ACC detects a fast approaching forward vehicle (e.g., a vehicle that the host vehicle is overtaking at a rate above a predetermined velocity threshold, such as 5 ft/s, 10 ft/s, or some other predetermined fast approach threshold, which may be a function of distance, velocity, or both), and determines that the forward vehicle is approaching at a velocity in excess of the predetermined velocity threshold. The controller sends a signal to the compressor motor 16 to begin compressing air in order to draw down the SOC to accommodate brake regeneration. The processor 30 executes the brake regeneration monitoring module, which evaluates SOC and air tank pressure information from the SOC monitor 28 and the pressure monitoring module 44 respectively to determine whether there is sufficient SOC capacity and/or sufficiently low tank pressure to permit brake regeneration. If brake regeneration is available, then a message is sent from the controller and/or processor to the traction motor to act as a generator and perform brake regeneration. If brake regeneration is not available, then the processor determines whether tank air pressure is equal to or greater than a predetermined tank cut-out pressure threshold. If tank pressure is at or above the predetermined tank cut-out pressure threshold, then the processor determines whether the cut-out pressure threshold previously has been increased. If the cut-out pressure threshold has already been increased (e.g., to a predetermined increased cut-out pressure threshold level, such as 150 psig or some other predetermined pressure threshold level), then forward vehicle monitoring is resumed without further action. If cut-out pressure has not already been increased, then the processor executes one or more pressure threshold adjustment modules 46, including a cut-out pressure threshold adjustment module 50 that increases the cut-out pressure threshold i.e., the pressure threshold at which the compressor motor turns off) to a predetermined increased cut-out pressure threshold level that is higher than a nominal cut-out pressure threshold (e.g., 130 psig or the like).

If tank pressure has not yet reached the predetermined tank cut-out pressure threshold, then the processor determines whether a cut-in pressure threshold previously has been increased. If so, then forward vehicle monitoring is resumed without further action. If the cut-in-pressure has not been increased from its original or initial predetermined setting, then the processor executes a cut-in pressure threshold adjustment module 48 that increases the cut-in pressure threshold to be just above (e.g., 0.1 psig above, 0.5 psig above, 1 psig above, etc.) a currently measured tank air pressure to cause the compressor motor to turn on and draw charge from the high voltage battery, thereby reducing the SOC to accommodate brake regeneration. Once SOC falls to an acceptable level (e.g., some predetermined percentage of a maximum charge capacity for the battery), then the controller sends a command to the traction motor to initiate brake regeneration.

In this manner, the described systems and methods provide several advantageous functionalities. For instance, intervention occurs earlier to slow the vehicle after an ACC-detected fast approach event. That is, a regeneration request sent from the controller to the generator (i.e., the traction motor, operating as a generator) begins to slow the vehicle. Additionally, an alert is presented to the driver (e.g., via the user interface) to feather the brakes. This is a form of driver feedback since the "feel" of the intervention with the vehicle slowing when the generator loads the system is very noticeable in heavy duty hybrids. This in turn notifies the driver to use the brake gently to control the fast approach. When the driver touches the brake gently, the generator applies more load which provides more energy recovery (i.e., the friction brakes do not make contact). Furthermore, driver warnings and driver training are provided to moderate braking behavior. That is, each regeneration event, which can be perceived and felt by the driver, provides driver training to reinforce moderate braking behavior, which is advantageous because the fuel economy of hybrids is very driver-dependent and there is a great effort to train the drivers with efficiency monitors in the cab that graphically show the effects of hard starts and stops. There is also a safety aspect since the fast approach may require driver intervention before the ACC causes the friction brakes to be applied.

The described systems and methods thus solve the widely recognized problem in heavy duty hybrid vehicle operation that unnecessarily sudden stops associated with aggressive driving do not allow ample time for brake energy regeneration by anticipating a detected fast approach and mitigating a subsequent sudden stop with more timely vehicle deceleration and automated brake regeneration. Brake energy regeneration is facilitated by intervening upon fast approach detection and commencing brake regeneration and deceleration earlier on in fast approach scenarios. The more quickly the automated brake regeneration is initiated by the generator braking action, the greater the amount of time there is for kinetic energy to be recovered. This feature improves fuel economy and consistency and lowers emissions with reduced driver behavior dependence.

It will be appreciated that although the herein-described systems and methods relate to an air compressor system that is manipulated to control vehicle battery SOC, any suitable electrical system on the vehicle (e.g., a hydraulic system, etc.) may be employed in a similar fashion to draw charge from the battery to permit a brake regeneration event, and that the described systems and methods are not limited to being employed in conjunction with an air compressor.

It will further be appreciated that although FIG. 1 depicts the system 10 as comprising an air compressor that is operably coupled to a controller that performs the described functions, in another embodiment the processor 30 and memory 32 are integral to the air compressor 18, the EACS component 12, and/or the ACC module 13.

Figure 2:
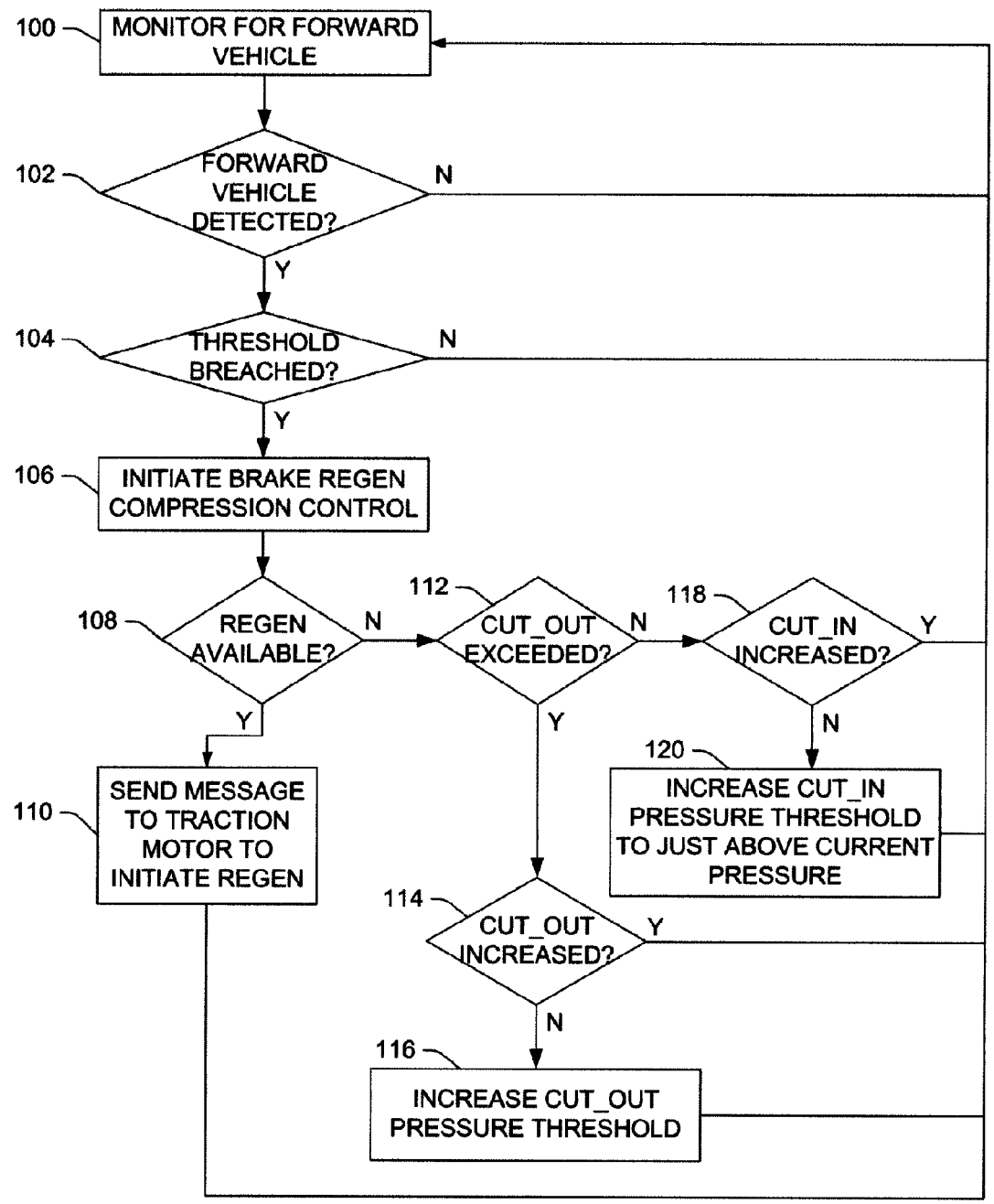
FIG. 2 illustrates a method for mitigating aggressive braking activity in order to facilitate brake regeneration opportunities to maintain a hybrid commercial vehicle high voltage battery within a desired range of charge.

FIG. 2 illustrates a method for mitigating aggressive braking activity in order to facilitate brake regeneration opportunities to maintain a hybrid commercial vehicle (or the like) high voltage battery (e.g., 200V, 300V, or some other high voltage battery) within a desired range of charge, such as is performed by the controller 15 and/or the processor 30 (FIG. 1). At 100, forward vehicle monitoring is performed. At 102, a determination is made regarding whether a forward vehicle has been detected in front of the host vehicle. If not, then the method reverts to 100 for continued monitoring. If a forward vehicle is detected, then at 104, a determination is made regarding whether the forward vehicle has breached a fast approach velocity threshold (e.g., 4 ft/s, 6 ft/s, or some other predetermined velocity threshold), above which the forward vehicle is determined to be fast approaching the host vehicle in a manner that warrants a braking intervention. If not, then the method reverts to 100 for continued monitoring.

If the forward vehicle is fast approaching the host vehicle, then at 106 brake regeneration adjusted compressor control is initiated. At 108, a determination is made regarding whether brake regeneration is available (e.g., whether sufficient capacity is available in the battery SOC) or otherwise can be performed. If brake regeneration is available, then at 110, a message is sent to the traction motor to act as a generator and perform brake regeneration. If brake regeneration is not available, then at 112, a determination is made regarding whether tank air pressure is equal to or greater than a predetermined tank cut-out pressure threshold. If tank pressure is at or above the predetermined tank cut-out pressure threshold, then at 114 a determination is made regarding whether the cut-out pressure threshold has been increased. If the cut-out pressure threshold has already been increased (e.g., to a predetermined increased cut-out pressure threshold level, such as 150 psig or some other predetermined pressure threshold level), then the method reverts to 100 for continued monitoring. If cut-out pressure has not already been increased, then at 116, the cut-out pressure threshold is increased to the predetermined increased cut-out pressure threshold level. The method then reverts to 100 for continued monitoring.

If tank pressure has not yet reached the predetermined tank cut-out pressure threshold as determined at 112, then at 118, a determination is made regarding whether a cut-in pressure threshold has been increased. If the cut-in pressure has already been increased, then the method reverts to 100 for continued monitoring. If the cut-in-pressure has not been increased from its original or initial predetermined setting, then at 120, the cut-in pressure threshold is adjusted to be just above (e.g., 0.1 psig above, 0.5 psig above, 1 psig above, etc.) a currently measured tank air pressure to cause the compressor motor to turn on and draw charge from the high voltage battery, thereby reducing the SOC to accommodate brake regeneration. The method then reverts to 100 to for continued monitoring.

Figure 3:
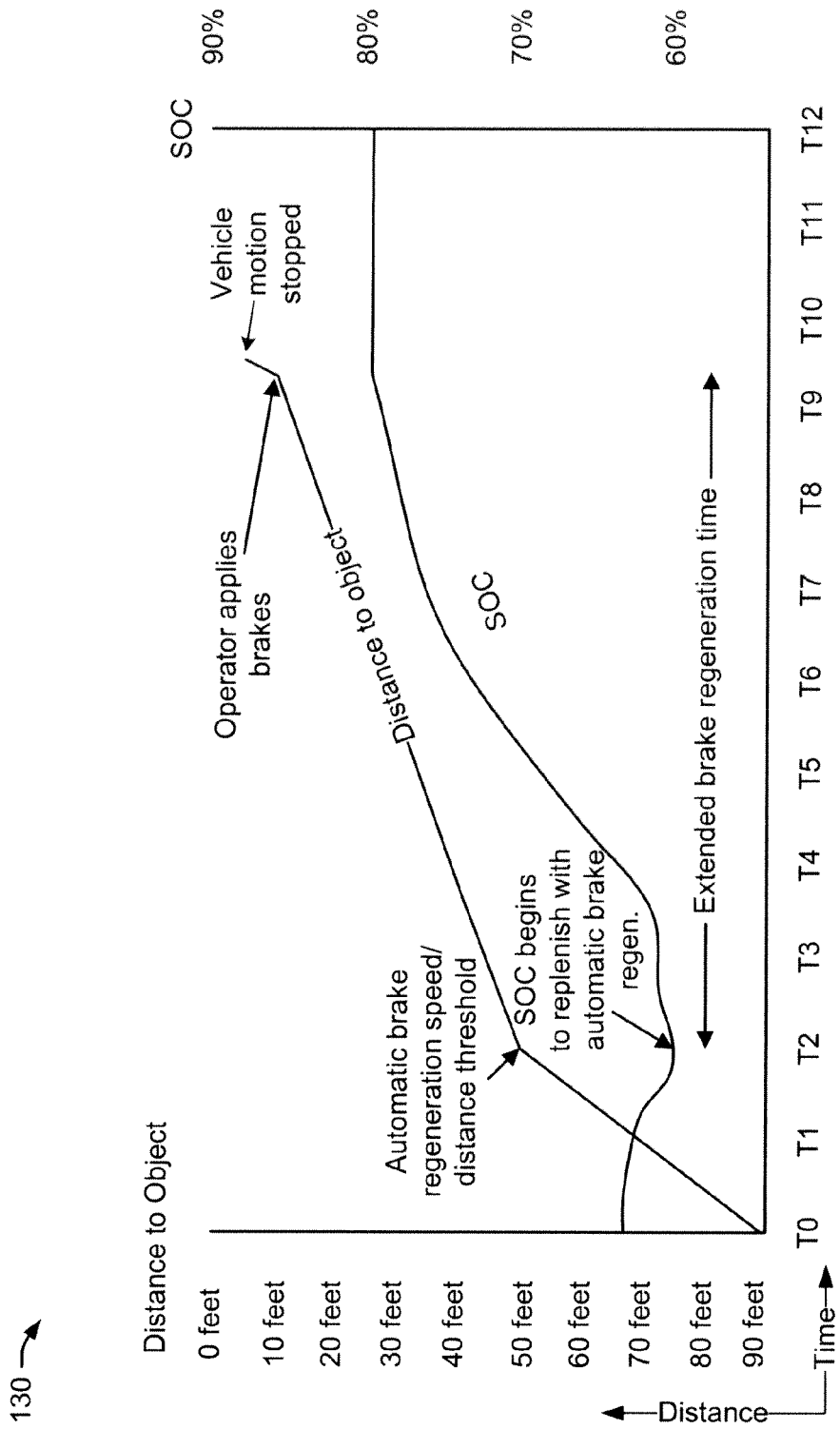
FIG. 3 illustrates a graph depicting battery state of charge (SOC) stored via brake regeneration or intervention as a function of time and distance to a forward object such as a vehicle.

FIG. 3 illustrates a graph 130 depicting SOC stored via brake regeneration or intervention as a function of time and distance to a forward object such as a vehicle. Time is shown on the abscissa as predetermined increments T1, T2, etc. (e.g., seconds or the like). On the left ordinate, distance to a forward object or vehicle is shown.

On the right ordinate, SOC is shown. At T2 (e.g., 2 seconds or the like), a forward object has rapidly approached the host vehicle (or the host vehicle has rapidly overtaken the forward vehicle), such that in the time from T0 to T2, the forward vehicle has gotten 40 feet closer to the host vehicle. This fast approach of 20 ft/s above a predetermined fast approach threshold (e.g., of 5 ft/s, 10 ft/s, 12 ft/s, or some other predetermined fast approach threshold, which may be a function of the particular ACC model employed in conjunction with the herein-described systems and methods), and therefore the ACC module has detected the fast approaching forward vehicle and the controller (or the ACC module) has determined that the threshold has been exceeded. It will be appreciated that the fast approach threshold may be a function of approach velocity, approach distance, or both. In one embodiment, the fast approach threshold is programmable to provide flexibility.

Once the ACC has detected the forward vehicle and determined that it is a fast-approaching vehicle, the controller (or the ACC) requests brake regeneration from the traction motor (i.e., a request is sent to the traction motor to act as a generator). The load created by the traction motor acting as a generated slows the vehicle, and the deceleration can be felt or perceived by the driver, which acts as a form of feedback to the driver that the vehicle is being driven too aggressively. The extended brake regeneration time spans several time periods (T2-T9, approximately), and thus provides an additional 20% of SOC to the battery. In the illustrated example, the host vehicle closes additional distance to the forward vehicle during the extended brake regeneration period, then the driver applies the brakes. The vehicle then stops before impacting the forward vehicle.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A controller unit that facilitates mitigating hard braking applications and extending a brake regeneration period in a commercial hybrid host vehicle upon detection of a fast approaching forward vehicle, comprising:
a memory that stores computer-executable instructions for extending a brake regeneration period in a commercial hybrid vehicle upon detection of the fast approaching forward vehicle;
a processor configured to execute the computer-executable instructions, the instructions comprising:
receiving an indication of the detected fast-approaching forward vehicle;
determining that the fast approaching vehicle has breached at a predetermined fast approach threshold;
initiating brake regeneration-adjusted compressor control;
determining whether brake regeneration capacity is available; and
sending a brake regeneration command to a traction motor to initiate brake regeneration to slow the host vehicle prior to initiation of friction braking if brake regeneration capacity is available; when brake regeneration is not available, comparing a measured air tank pressure in an onboard electric air charging system to a cut-out air pressure threshold;
determining that the cut-out air pressure threshold has been exceeded; determining that the cut-out pressure threshold is at a nominal operating threshold value; increasing the cut-out air pressure threshold by a predetermined amount; and reevaluating whether brake regeneration is available.

2. The controller unit according to claim 1, wherein the indication of the fast approaching vehicle is received from an adaptive cruise control (ACC) unit that detects and monitors at least one forward vehicle in front of the host vehicle.

3. The controller unit according to claim 2, wherein the ACC unit is an adaptive cruise with braking (ACB) unit.

4. The controller unit according to claim 1, the instructions further comprising:
when the measured air tank pressure is less than the cut-out air pressure threshold:
verifying that a cut-in pressure threshold has not previously been increased; and
setting a cut-in pressure threshold to be 1 psig or less above the measured air tank pressure in order to cause an onboard air compressor motor to begin to compress air and draw charge from a high-voltage battery on the host vehicle to create capacity for brake regeneration.

5. The controller unit according to claim 1, wherein the instructions further comprise:
providing haptic feedback to a driver of the host vehicle, thereby providing an alert that brake regeneration is being performed.

6. The controller unit according to claim 1, the instructions further comprising, when determining whether brake regeneration is available:
comparing a measured state of charge (SOC) of a high voltage battery on the host vehicle to a predetermined SOC threshold;
sending the brake regeneration command to the traction motor when the measured SOC is less than the predetermined SOC threshold; and
refraining from sending the brake regeneration command to the traction motor when the measured SOC is equal to or greater than the predetermined SOC threshold.

7. The controller unit according to claim 6, wherein the predetermined SOC threshold is approximately 70% of a maximum SOC rating for the high voltage battery.

8. An apparatus for mitigating hard braking applications and extending a brake regeneration period in a commercial hybrid host vehicle upon detection of a fast approaching forward vehicle, comprising:
means for detecting and monitoring at least one forward vehicle in front of the host vehicle;
means for performing brake regeneration;
means for receiving an indication of the detected fast-approaching forward vehicle;
means for determining that the fast approaching vehicle has breached at a predetermined fast approach threshold;
means for initiating brake regeneration-adjusted compressor control;
means for determining whether brake regeneration capacity is available; and
means for sending a brake regeneration command to the means for performing brake regeneration to initiate brake regeneration to slow the host vehicle prior to initiation of friction braking if brake regeneration capacity is available; means for comparing, when brake regeneration is not available, a measured air tank pressure in an onboard electric air charging system to a cut-out air pressure threshold;
means for determining that the cut-out air pressure threshold has been exceeded;
means for determining that the cut-out pressure threshold is at nominal operating threshold value;
means for increasing the cut-out air pressure threshold by a predetermined amount; and
means for reevaluating whether brake regeneration is available.

* * * * *

UNITED STATES PATENT AND TRADEMARK OFFICE
CERTIFICATE OF CORRECTION

PATENT NO. : 8,543,273 B2
APPLICATION NO. : 13/368562
DATED : September 24, 2013
INVENTOR(S) : David J. Pfefferl Page 1 of 1

It is certified that error appears in the above-identified patent and that said Letters Patent is hereby corrected as shown below:

In the Specification

Column 4, line 2, "tilled" should read --filled--

Column 6, line 29, "i.e," should read --(i.e.,--

Column 8, line 34, "20 ft/s above" should read --20 ft/s is above--

Signed and Sealed this
Fifth Day of November, 2013

Teresa Stanek Rea
*Deputy Director of the United States Patent and Trademark Office*